US011483496B2

(12) United States Patent
Gilad et al.

(10) Patent No.: US 11,483,496 B2
(45) Date of Patent: Oct. 25, 2022

(54) SYSTEM AND METHOD FOR SYNCHRONIZING AUXILIARY CONTENT TO A VIDEO STREAM

(71) Applicants: Oran Gilad, Herzliya Pituach (IL); Samuel Chenillo, New York, NY (US); Oren Steinfeld, Kfar Saba (IL)

(72) Inventors: Oran Gilad, Herzliya Pituach (IL); Samuel Chenillo, New York, NY (US); Oren Steinfeld, Kfar Saba (IL)

( * ) Notice: Subject to any disclaimer, the term of this patent is extended or adjusted under 35 U.S.C. 154(b) by 0 days.

(21) Appl. No.: 17/670,480

(22) Filed: Feb. 13, 2022

(65) Prior Publication Data
US 2022/0166940 A1 May 26, 2022

Related U.S. Application Data

(63) Continuation-in-part of application No. 17/330,419, filed on May 26, 2021, which is a continuation-in-part of application No. 17/072,491, filed on Oct. 16, 2020, now Pat. No. 11,048,946, which is a continuation-in-part of application No. 16/389,957, filed on Apr. 21, 2019, now Pat. No. 10,867,185.

(51) Int. Cl.
| | | |
|---|---|---|
| *H04N 5/275* | (2006.01) | |
| *H04N 5/067* | (2006.01) | |
| *H04N 21/81* | (2011.01) | |
| *H04N 21/2187* | (2011.01) | |
| *H04N 21/43* | (2011.01) | |

(52) U.S. Cl.
CPC .......... *H04N 5/275* (2013.01); *H04N 5/0675* (2013.01); *H04N 21/2187* (2013.01); *H04N 21/4307* (2013.01); *H04N 21/812* (2013.01)

(58) Field of Classification Search
CPC .. H04N 5/275; H04N 5/0675; H04N 21/2187; H04N 21/4307; H04N 21/812
See application file for complete search history.

(56) References Cited

U.S. PATENT DOCUMENTS

| | | | |
|---|---|---|---|
| 5,543,856 A | 8/1996 | Rosser et al. | |
| 7,661,121 B2* | 2/2010 | Smith | G11B 27/005 |
| | | | 725/135 |
| 8,611,422 B1* | 12/2013 | Yagnik | G06F 16/7834 |
| | | | 375/240.12 |
| 9,514,381 B1 | 12/2016 | Ludwigsen | |
| 10,594,620 B1* | 3/2020 | Greenwood | G06F 9/5072 |
| 11,004,456 B2 | 5/2021 | Harkness et al. | |
| 2019/0311747 A1* | 10/2019 | Boonmee | G06V 20/46 |

\* cited by examiner

*Primary Examiner* — Joshua D Taylor
(74) *Attorney, Agent, or Firm* — RosserIP, LLC; Roy Rosser

(57) ABSTRACT

A system and method of synchronizing auxiliary content to a video stream is disclosed that uses a block of bit-vectors linked to a target frame in a video steam. The block of bit-vectors consists of a multi-frame sequence of image bit-vectors. The video stream and block of bit-vectors are transmitted to an end user device that uses the bit-vector block to uniquely identify the target frame. The target frame is used to synchronize auxiliary content to the video stream.

10 Claims, 5 Drawing Sheets

SYSTEM AND METHOD FOR SYNCHRONIZING AUXILIARY CONTENT TO A VIDEO STREAM

CROSS-REFERENCE TO RELATED APPLICATIONS

This is a continuation-in-part application of U.S. Ser. No. 17/330,419 entitled "System and Method for Remunerating a Display of a Cognate Substitute Video" filed on 26 May 2021 that is in turn a continuation-in-part application of U.S. Ser. No. 17/072,491 entitled "System and Method for Identifying Cognate Image Sequences" filed on Oct. 16, 2020 that issued as U.S. Pat. No. 11,048,946 on Hun. 29, 2021 and is in turn a continuation-in-part of U.S. patent application Ser. No. 16/389,957 entitled "System and Method for Media Segment Identification" filed on Apr. 21, 2019 that issued as U.S. Pat. 10,867,185 on Dec. 15, 2020, the contents of all of which are hereby incorporated by reference.

BACKGROUND OF THE INVENTION

(1) Field of the Invention

The invention relates to systems and methods of targeting auxiliary content to a video stream at the edge of a distribution network, and more particularly to using a bit-vector block consisting of a multi-frame sequence of image bit-vectors linked to a target frame to synchronize auxiliary content to a video stream.

(2) Description of Related Art

In the field of broadcast communications, it is sometimes desirable to link auxiliary content to a broadcast stream of video at a location downstream of where the stream of video originated, i.e., at the edge of the distribution network, with a high degree of accuracy. For instance, in the field of virtual advertising images may be inserted into video streams so as to make them appear as if they were in the original scene. While the promotional image may be inserted at the origination point of the broadcast, it may be desirable to have targeted advertising in which the promotional image may be inserted downstream of the broadcast, preferably by an end user's viewing device. In this way, the inserted image may be selected to suit the individual user. This may, for instance, be accomplished by sending the keying, occlusion and tracking data used for making the virtual insertion to the end user device and have the virtual inserted by that device.

While such information may be included in the metadata accompanying a video stream, there is a problem in that the video stream and the metadata needed for tasks such as targeted advertisement insertion are typically managed by different entities. For instance, the video stream is typically supplied and managed by a first party such as, but not limited to, the content owner or service providing the video streaming, while the data required for virtual targeted advertising is typically supplied and managed by a second party such as, but not limited to a tech company providing the targeted advertising service.

If the metadata required for the auxiliary content is embedded in the video, those two separate technologies have to be integrated. This integration is not only technically and commercially challenging to manage, but would need to be redone for each content provider. The scope of the challenge may be seen in that, for instance, tens of thousands of YouTube channels are each a potential content provider. Redoing the integration of each of them would be difficult to implement.

The problem then becomes how to synchronize the auxiliary content with the video stream with single frame accuracy when the video and auxiliary content are provided separately.

The relevant prior art includes:

U.S. Pat. No. 5,543,856 issued to Rosser et al. on Aug. 6, 1996 entitled "System and method for downstream application and control electronic billboard system" that describes a system and method for authorizing, controlling, and monitoring the insertion of advertising indicia and other video images into a broadcast video stream by an Electronic Billboard system operated at a location remote from a video program origination location. The disclosed control means will be implemented in the form of a user key which is presupplied to an operator of the remote Electronic Billboard system, a broadcast key supplied to that operator at or near the time of transmission of the broadcast video stream, and a verification means operated in conjunction with the remote Electronic Billboard system to verify that those keys correspond to a predetermined criteria. Upon such verification, the remote Electronic Billboard system is enabled to operate on the broadcast video stream. The control means may also be applied for maintaining the integrity of either or both the products being advertised and the event being broadcast.

U.S. Pat. No. 11,004,456 issued to Harkness et al. on May 11, 2021, entitled "Methods, apparatus and articles of manufacture to provide secondary content in association with primary broadcast media content" that describes methods, apparatus, and articles of manufacture to provide media content are disclosed. Example apparatus disclosed herein include means for identifying primary media content presented on a first media presentation device. Disclosed example apparatus also include means for accessing a secondary content schedule associated with the primary media content. The secondary content schedule includes a plurality of secondary content items and time values associated with the secondary content items. The secondary content items are also associated with a loyalty value for a user of the first media presentation device. Disclosed example apparatus further include means for selecting one of the secondary content items to be accessed in response to a timestamp associated with the primary media content being between time values associated with the selected one of the secondary content items in the secondary content schedule.

U.S. Pat. No. 9,514,381 issued to Ludwigsen et al. on Dec. 6, 2016 entitled "Method of identifying and replacing an object or area in a digital image with another object or area" that describes a system and method for object and area detection and replacement in an image includes identifying an object or area in one or more sequential images that form a moving image sequence and replacing some or all of the identified object or areas with another image such that the image looks to be part of the original composition of the original image including lighting, shadows, placement, occlusion, orientation, position, and deformation.

Various implementations are known in the art, but fail to address all of the problems solved by the invention described herein. Various embodiments of this invention are illustrated in the accompanying drawings and will be described in more detail herein below.

BRIEF SUMMARY OF THE INVENTION

An inventive system and method of synchronizing auxiliary content to a video stream is disclosed.

In a preferred embodiment, a target frame may be identified in a video stream. A block of bit-vectors linked to the target frame may then be created. The block of bit-vectors may consist of a multi-frame sequence of image bit-vectors. Each bit-vector may, for instance, be a relatively short binary string uniquely identifying an image, or a feature in that image. Such a string may, for instance, be obtained by reducing the image to a small number of sub-units, say 64, and then making a binary comparison of a value of each subunit to an adjacent subunit or some metric of all the subunits. The result of such comparisons may then be a bit-vector consisting of 64 ones and zeros. The comparison may, for instance, be of average values, of median values or of frequencies to create an average bit-vector, a median bit-vector, and a frequency bit-vector respectively.

The video stream and block of bit-vectors may then be transmitted to an end user device. The video stream and the block of bit-vectors may be transmitted via the same transmission path, or they may be transmitted via different transmission paths.

The end user device may then use the block of bit-vectors to uniquely identify the target frame.

The target frame may then be used, for instance, to synchronize auxiliary content to the video stream. The auxiliary content may be resident on the end user device, or it may have been obtained from a third party, or it may have been sent along with the block of bit-vectors. The auxiliary content may be any audio-visual content such as, but not limited to, images, video, or audio. The auxiliary content may also or instead contain process instructions that may provide details of how to integrate the auxiliary content with the video stream.

The end user device may then display the synchronized video stream and said auxiliary content on said end user device.

In one exemplary use of the method, the target frame may be used for virtual insertion that may be performed at the end user device instead of at the point of origin of the broadcast. This may, for instance, be implemented by, at the point of origin, obtaining any necessary insertion data such as, but not limited to, insertion keying data, occlusion data and frame tracking data. That insertion data may be linked to the target frame and may be sent to the end user device along with the block of bit-vectors. The end user device may then use the block of bit-vectors to identify the target frame, and then use that and the insertion data to virtually insert auxiliary content into the video stream.

While the video stream may be compressed for transmission by a lossy compression method such as, but not limited to, MPEG, it may be desirable that the block of bit-vectors and insertion data be compressed by a lossless compression method such as, but not limited to, Huffman compression or Arithmetic compression.

Therefore, the present invention succeeds in conferring the following, and others not mentioned, desirable and useful benefits and objectives:

It is an object of the present invention to provide a means of synchronizing s video stream supplied by a first party with auxiliary content that may be provided a second party that may operate independently of the first party.

It is a further object of the present invention to provide a means of synchronizing video streams that is independent of time codes or other data that may be corrupted or removed during transmission.

DETAILED DESCRIPTION OF THE INVENTION

Figure 1:
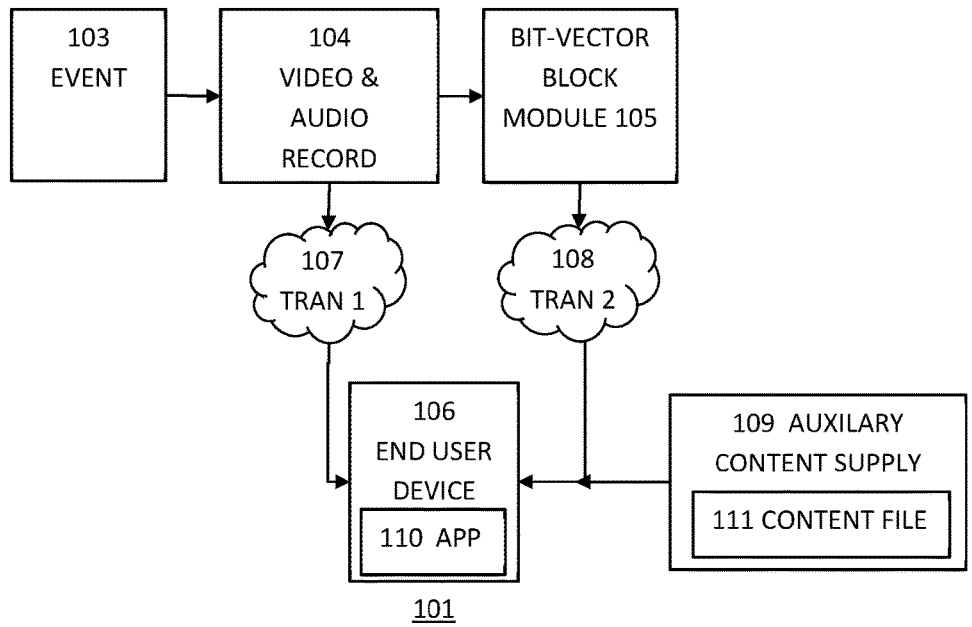
FIG. 1 shows a schematic representation of a system for synchronizing auxiliary content to a video stream.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic representation 101 of a system for synchronizing auxiliary content to a video stream.

A video and audio recording 104 of an event 103 may be produced using, for instance, digital cameras and microphones. The event 103 may, for instance, be, but is not limited to, a sporting event, a concert, or some staged theatrical event. The video and audio of the event may be broadcast or streamed live, or it may be recorded and broadcast or streamed later, or it may be stored in a data base that may be accessed over the internet by end users.

A bit-vector block module 105 that may, for instance, be functional on a digital processor, may access the video and audio recording 104 and locate one or more particular frames of interest that may be target frames. The bit-vector block module 105 may then create one or more blocks of bit-vectors that may each consist of a multi-frame sequence of image bit-vectors linked to a particular target frame as described in detail below.

In one embodiment, the video and audio recording may be transmitted to an end user device 106 via a first transmission path 107 while the bit-vector block may be transmitted via a second transmission path 108 to the same end user device 106.

The end user device 106 may also receive one or more auxiliary content files 111 from an auxiliary content supply 109.

A synchronize and display app 110 functioning on the end user device 106 may use the bit-vector blocks to locate each target frame and use the target frame to synchronize the appropriate content file to the appropriate place in the video stream of the video recording with single frame accuracy. The combined, synchronized video stream and auxiliary content of the auxiliary content file may then be displayed on the end user device.

Figure 2:
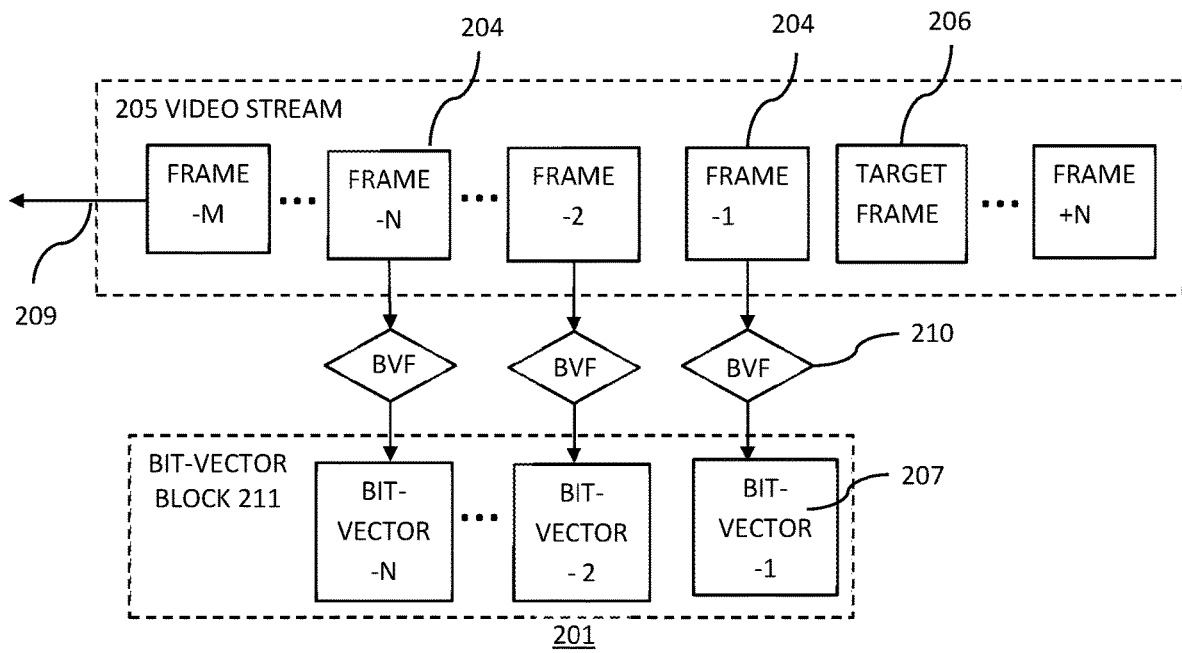
FIG. 2 shows a schematic representation of a method of creating a frame identifying block of bit-vectors.

FIG. 2 shows a schematic representation 201 of a method of creating a frame identifying block bit-vector.

A video stream 205 may consist of a series of video frames 204. The video stream may be flowing in a direction 209 and there may be a frame of particular interest, or target frame 206.

One method of creating a bit-vector block linked to a particular frame may be to obtain image bit-vectors for each frame as it is generated, or arrives, using a bit-vector function 210 that may be operable on a digital processor.

A bit-vector may be a relatively short binary string that uniquely identifies a frame or a feature in a frame. A representative method, or bit-vector function, for obtaining a bit-vector may proceed in the following manner:

Step 1. Reduce the size of the image to a small, fixed size, such as, but not limited to, an 8 by 8-pixel image. This may, for instance, be accomplished by a simple averaging of the individual red, green and blue (RGB) pixel values in a block of pixels. More complex methods of image reduction such as, but not limited to, using multiple passes in each of which a block of 4 pixels is averaged down to a to a single pixel, with passes being repeated until a desired final image size is reached, may also or instead be utilized. Many methods of reducing the size of images are known in the art, and any suitable one of them may be used instead.

Step 2. Reduce the color by converting the reduced image from an RGB color image to a grayscale image. This may, for instance, be accomplished by adding the RGB values of a pixel of the reduced image and dividing the resultant sum by 3. In the case where the image was reduced to an 8 by 8 image have 64 pixels, there would now be a reduced image having 64 grayscale pixels.

Step 3: Calculate the average value of the grayscale image pixels, i.e., sum the individual grayscale values, and divide that sum by the number of pixels.

Step 4: Generate the bit-vector. The bit-vector may, for instance, be generated by substituting a "1" if the pixel value is greater than or equal to the average pixel value, or a "0" if it is less than that average pixel value. This process may generate a binary string equal in length to the number of pixels in the reduced image, i.e., in our example of a reduction to an 8 by 8 image having 64 pixels, the result may be 64-bit binary string that may be the bit-vector obtained by the average bit-vector function.

Related methods such as a median bit-vector function may, for instance, use a median value rather than the average value. Similarly, a Fast Fourier Transform may be used to obtain a representative frequency of each of the small fixed size images and that frequency may be compared to an average or mean frequency as a frequency bit-vector function.

These image bit-vectors may be stored in a buffer so that when the target frame 206 appears or is located, there may be a multi-frame sequence of image bit-vectors that are linked to that target frame by being the N image bit-vectors that precede the target frame. These N preceding image bit-vectors may then together form a bit-vector block 211 that may later be used to locate the target frame when it is received by a downstream device.

The bit-vector function 210 used to create a bit-vector for each frame may utilize a single bit-vector function or it may be a combination of bit-vector functions. The bit-vector function may for instance be one of, or a combination of the bit-vector functions outlined above such as, but not limited to, an average bit-vector function, a median bit-vector function, and a frequency bit-vector function, or some combination thereof.

In an alternate embodiment that be appropriate when the digital processor used to perform the bit-vector functions may have a large amount of memory available but limited processing power may be to buffer the video stream to accumulate sufficient frames that when a target frame appears, the bit-vectors functions may then be performed on the appropriate number of preceding frames to form an adequate bit-vector block.

The number of bit-vectors or video frames that need to be buffered to form an adequate bit-vector block may be as much as 10 seconds worth of video or as little as 5 frames, but is more typically about 2 seconds worth of video. At 30 frames per second, the most common frame rate of streaming video, this may be 60 bit-vectors or 60 frames.

Figure 3:
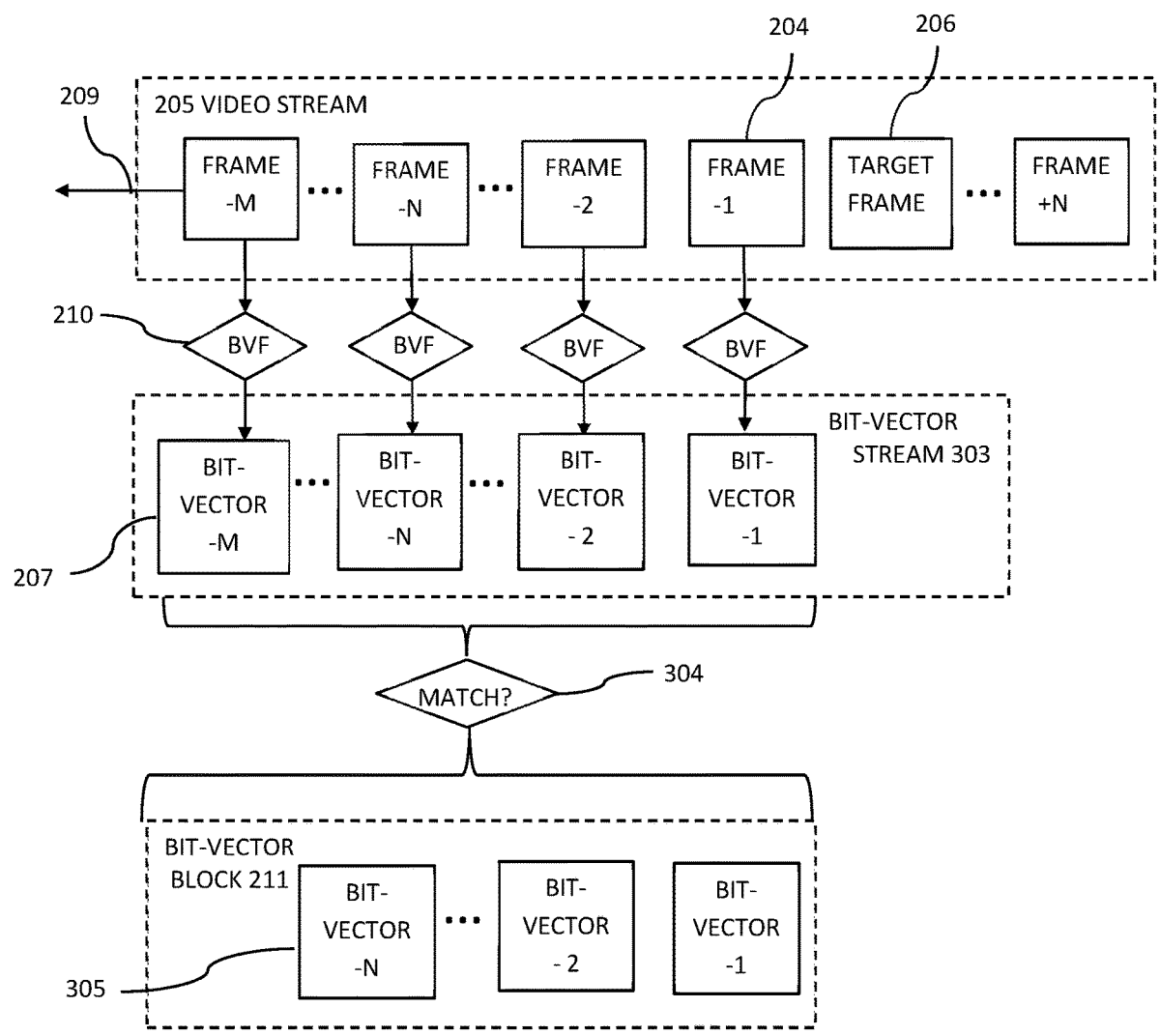
FIG. 3 shows a schematic representation of a method of identifying a target frame using a block of bit-vectors.

FIG. 3 shows a schematic representation 301 of a method of identifying a target frame using a block of bit-vectors.

A downstream end user device such as, but not limited to, a cellphone, set top box or laptop computer, may be receiving a video stream 205. The video stream that is flowing in the direction 209 may contain one or more target frames 206. To identify a target frame, the end user device may begin obtaining bit-vectors by performing the bit-vector function on each incoming frame using the same bit-vector function 210 that was used at the originating site. In this manner the end user device may begin generating a bit-vector stream 303 of image bit-vectors 207.

The end user device may then use a matching algorithm 304 to attempt to find a match to the bit-vector block 211 that is associated with the target frame 206. The matching algorithm may, for instance, begin by attempting to match a bit-vector of an incoming frame to a last bit-vector 305 of a block of bit-vectors. For instance, if the bit-vector block consists of the 60 bit-vectors preceding the target frame, the matching algorithm will attempt to match the incoming bit-vector to the $60^{th}$ bit-vector in the bit-vector block. If the bit-vectors are sufficiently close, the matching algorithm may then proceed to match the bit-vector of the next frame in the video stream 205 to the next bit-vector in the bit-vector block. It may continue to proceed in this manner until all bit-vectors in the bit-vector block have been matched, at which point the next frame in the video stream will be the target frame. If at any point during this sequence, a match is not found, the matching routine may then proceed to attempting to match the bit-vectors of the incoming video to the last bit-vector in the bit-vector block, including attempting to match the bit-vector that failed to match to the last bit-vector in the bit-vector block.

The frames in the video stream 205 being received may not be identical to the frames in in the video stream at the point of origin due to errors introduced during transmission such as, but not limited to, errors due to lossy compression and decompression. The matching algorithm may, therefore, not be looking for exact matches of the bit-vectors, but may be looking for bit-vectors that are sufficiently close. Sufficiently close may, for instance, be defined by a Hamming distance between the bit-vectors.

In a further embodiment, the matching algorithm may not be looking for a match to each of the bit-vectors in the bit-vector block 211, but may allow for a certain number of mismatches. This may, for instance, be done in a manner analogous to the well-known Smith-Waterman algorithm used to find partial matches for short sequences in DNA or protein analysis.

Figure 4:
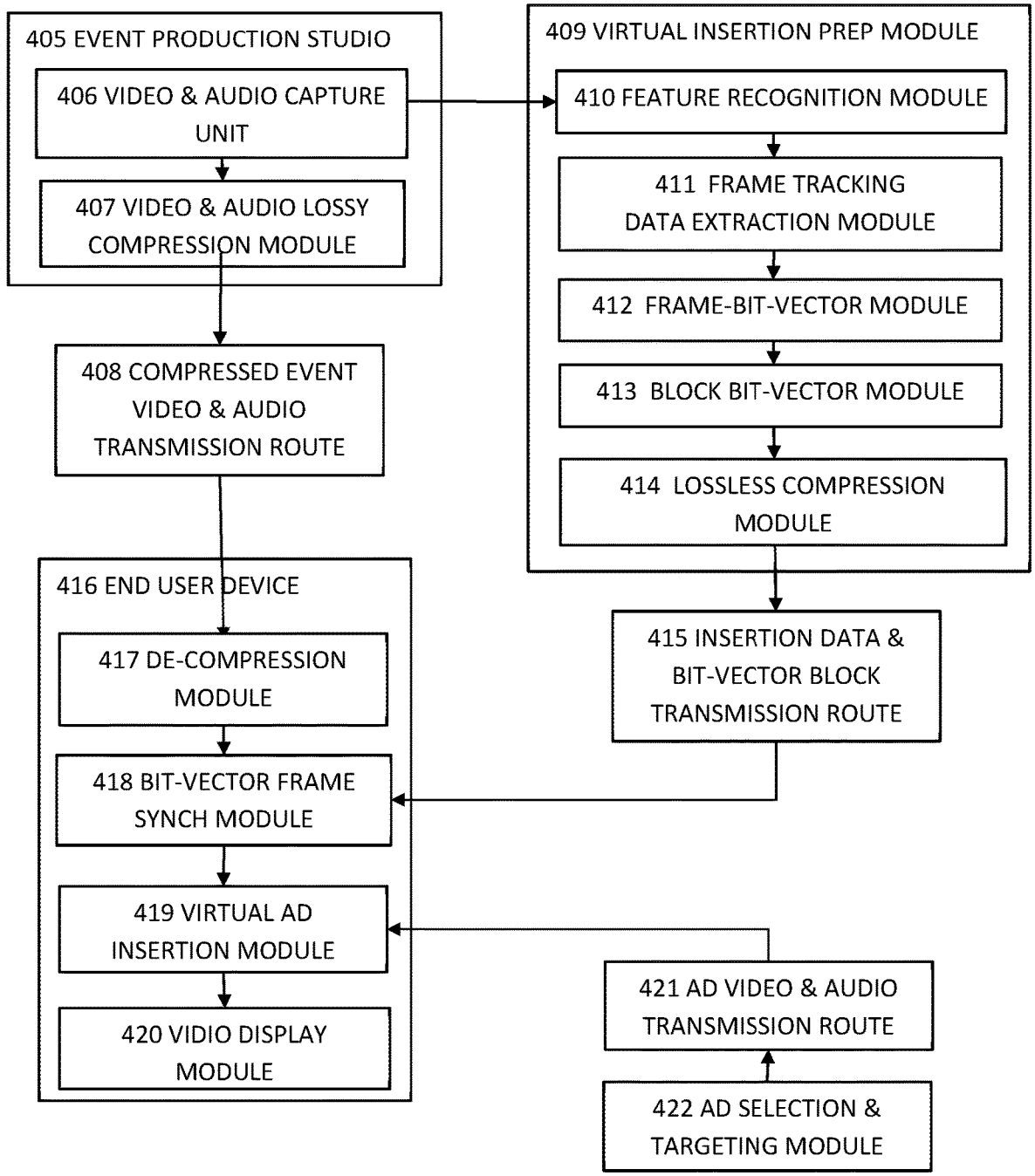
FIG. 4 shows schematic a representation of one embodiment of a system for synchronizing auxiliary content to a video stream.

FIG. 4 shows schematic a representation 401 of one embodiment of a system for synchronizing auxiliary content to a video stream.

The system of FIG. 4 may be configured to allow downstream virtual insertion using a block of bit-vectors to synchronize the downstream video to auxiliary content that may, for instance, be used for a function such as, but not limited to, downstream virtual insertion advertising.

The system may include an event production studio 405. The event production studio may consist of elements such as, but not limited to, a video and audio capture unit 406 and a video and audio lossy compression module 407. The video and audio capture unit 406 may consist of one or more cameras and one or more microphones as well as equipment for mixing, storing, and manipulating the video and audio. One additional unit may be the video and audio lossy compression module 407 that may be running on a digital processor and may employ lossy compression algorithms such as, but not limited to, MPEG and MP3.

The system may include a compressed event video and audio transmission route 408. This transmission route may be any suitable wired or wireless digital transmission route such as, but not limited to, Wi-Fi, fiber optic cable, or a satellite link, that may have sufficient bandwidth for transmitting the compressed event video and audio to an end user device 416. The user device may be any suitable digital device such as, but not limited to, a cellphone, a laptop computer, or a set top box.

The system may also include a virtual insertion preparation module 409. The virtual insertion preparation module may operate on a digital processor and may be part of the event production studio 405 or it may be located remotely. The virtual insertion preparation module may include a number of video processing modules such as, but not limited to, a feature recognition module 410, a frame tracking data extraction module 411, a frame-bit-vectoring module 412, a block bit-vector module 413, and a lossless compression module 414. In combination these modules may recognize frames suitable for the virtual insertion of images or video into one or more sequences of the event video. They may then extract all the information necessary for such insertion such as, but not limited to, an initial or target frame for insertion, key data for insertion, data for frame-to-frame tracking and data for occlusion.

The lossless compression module 414 may then compress all the data necessary for downstream virtual insertion, including occlusion masks and the block of bit-vectors of target frames, using a lossless compression algorithm such as, but not limited to, Huffman compression or Arithmetic compression.

In one embodiment of the invention, the insertion data may include an alpha layer. This alpha layer may, for instance, be calculated for optimal composition of the virtually inserted auxiliary image on top of the original video image. For optimal composition, the alpha layer may need to cover the entire area in which the auxiliary image is being inserted, and may need to be delivered with lossless compression. To reduce bandwidth requirements, it may be necessary to transform the alpha layer for each inserted auxiliary image to be a fixed size rectangle that is small than the original video image. To do this, it may also be necessary to provide extra parameters that may be used by the downstream device to unwarp the reduced size portion of the alpha layer to the correct position relative to the original video image.

The system may also include an insertion data and bit-vector block transmission route 415. The insertion data and bit-vector block transmission route may be any suitable wired or wireless digital transmission route such as, but not limited to, Wi-Fi, fiber optic cable, or a satellite link, that may have sufficient bandwidth for transmitting the losslessly compressed insertion data and associated bit-vector blocks.

The end user device 416 may be include a digital processor having a number of apps running modules such as, but not limited to, a de-compression module 417, a bit-vector frame synchronization module 418, a virtual ad insertion module 419, and a video display module 420.

The bit-vector frame synchronization module 418 may, for instance, receive the insertion data and bit-vector blocks and use them to locate the target frames in the decompressed event video.

The virtual ad insertion module 419 may then use the target frames and insertion data to insert video and audio appropriately synchronized to the decompressed event video. The inserted auxiliary content may, for instance, have been obtained from an ad selection and targeting module 422 and received via an ad video and audio transmission module 421.

In a further embodiment, the auxiliary content may already be resident on the end user device 416.

Figure 5:
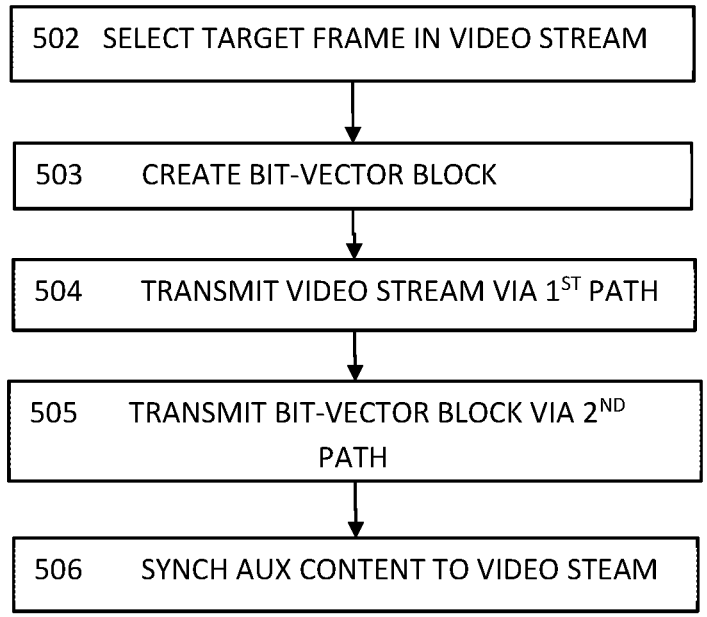
FIG. 5 shows a schematic flow diagram of representative steps of a method of synchronizing auxiliary content to a video stream.

FIG. 5 shows a schematic flow diagram 501 of representative steps of a method of synchronizing auxiliary content to a video stream.

In step 502 "SELECT TARGET FRAME IN VIDEO STREAM" a suitably programmed digital processor may be examining a stream of video to find a target frame of interest that may be useful for, for instance, frame accurate virtual image insertion. While searching for a suitable target frame the digital processor may also be programmed to produce and buffer image bit-vectors of the frames in the video stream. In one embodiment of the present invention, selection of the target frame may be performed by a human operator who may, or may not, be assisted by a suitably programmed computer that may, for instance, be operating a machine learning algorithm.

In step 503 "CREATE BIT-VECTOR BLOCK" the programmed digital processor may assemble a bit-vector block from N image bit-vectors that proceed the target frame and are stored in a bit-vector buffer. The N images bit-vectors are preferably sequential but may follow some pattern such as, but not limited to, every second bit-vector, or a bit-vector of every second frame. Such an arrangement may allow the processor more time to perform the bit-vector functions.

In step 504 "TRANSMIT VIDEO STREAM VIA $1^{ST}$ PATH" the video stream may be transmitted to an end user device via a first video path or transmission route. The video stream may have been suitably compressed prior to transmission, preferably by a high compression ratio, lossy algorithm such as, but not limited to, MPEG compression so as to minimize the bandwidth required for transmission.

In step 505 "TRANSMIT BIT-VECTOR BLOCK VIA $2^{ND}$ PATH" the bit-vector blocks may be transmitted to an end user device via a second transmission path or route. Prior to transmission, the bit-vector block may have been compressed, preferably by a lossless compression algorithm such as, but not limited to, a Huffman or arithmetic compression algorithm. Lossless compression is preferred so as to maintain the integrity of the data being transmitted while minimizing the bandwidth required to transmit it.

In step 506 "SYNCH AUX CONTENT TO VIDEO STEAM" an app or module operative on an end user device may use the bit-vector block data to identify a target frame in the incoming video stream and use it to synchronize auxiliary content to the incoming video stream to frame accurate synchronization.

Figure 6:
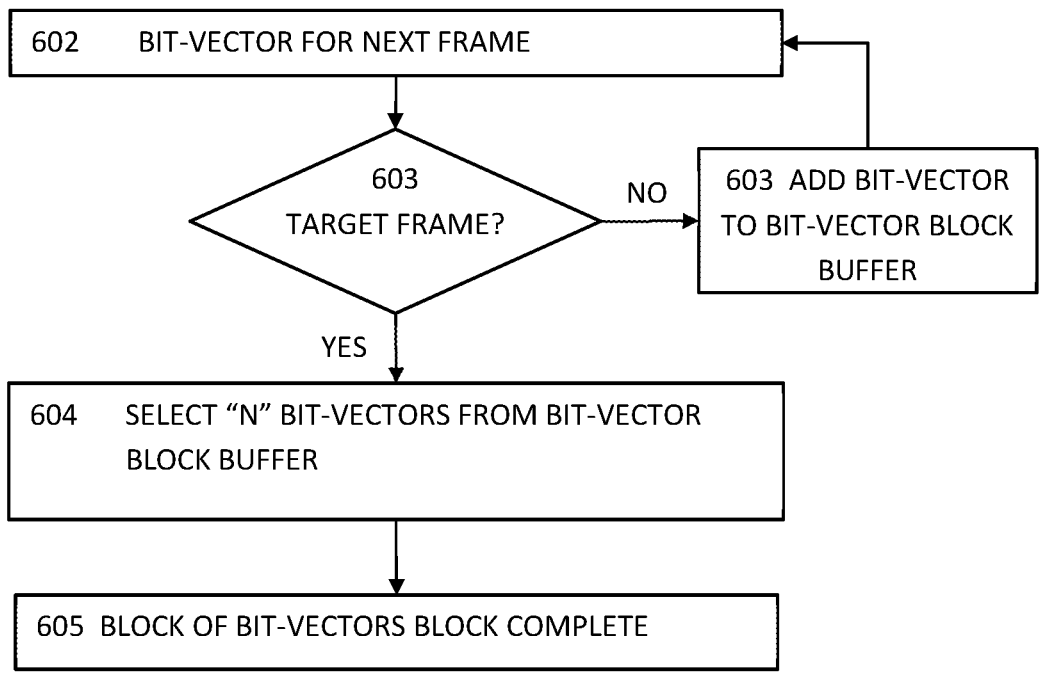
FIG. 6 shows a schematic flow diagram of representative steps of a method of creating a block of bit-vectors.

FIG. 6 shows a schematic flow diagram 601 of representative steps of a method of creating a bit-vector block.

In step 602 "BIT-VECTOR FOR NEXT FRAME" a suitably programmed digital processor may perform an bit-vector function on a next frame of a stream of video images to produce an image bit-vector.

In step 603 "TARGET FRAME? The programmed digital processor may evaluate the current frame of video it has received to test if it is a frame of interest, i.e., a target frame useful for some later synchronization need. If it is not a target frame, the programmed digital processor may proceed to step 603 "ADD BIT-VECTOR TO BIT-VECTOR BLOCK BUFFER". In this step the image bit-vector created in step 602 may be stored in a bit-vector block buffer. If a target frame is detected, the processor may instead proceed to step 604 "SELECT "N" BIT-VECTORS FROM BIT-VECTOR BLOCK BUFFER". In this step the preceding N bit-vectors stored in the bit-vector block buffer may be selected to form a bit-vector block. The bit-vector block may contain any suitable number of image bit vectors in a range from 5 image-bit vectors to 1000 image bit vectors, but it preferably contains bit-vectors of the preceding 2 seconds of video, i.e., about 60 bit-vectors for video that has a frame rate of 30 frames per second. Having selected the N frames, the processor may proceed to step 605 "BIT-VECTOR BLOCK COMPLETE". The creation of a bit-vector block linked to the target frame located in step 603 is complete.

Figure 7:
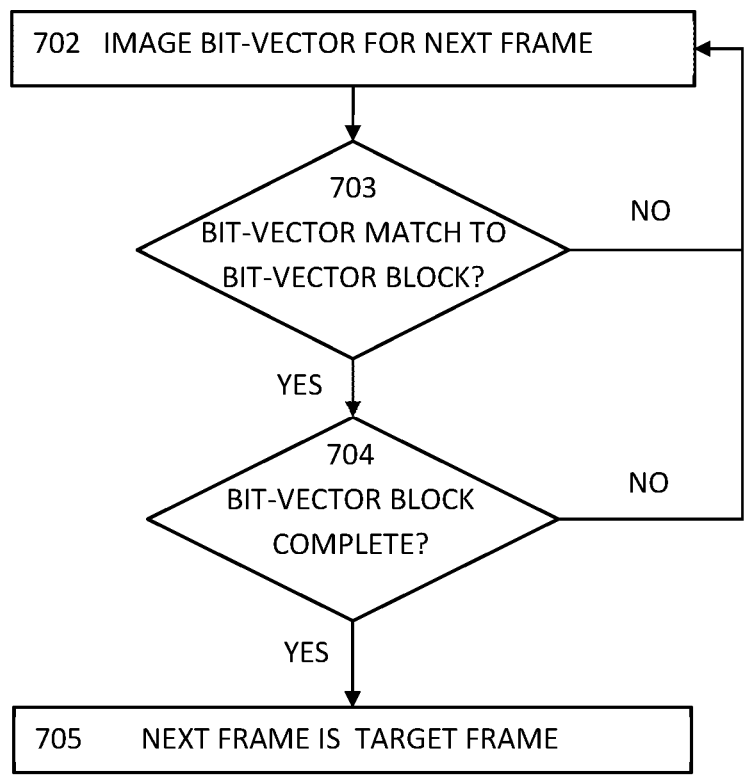
FIG. 7 shows a schematic flow diagram of representative steps of identifying a target frame using a block of bit-vectors.

FIG. 7 shows a schematic flow diagram 701 of representative steps of identifying a target frame using a bit-vector block.

In step 702 "IMAGE BIT-VECTOR FOR NEXT FRAME" a suitably programmed digital processor may perform a bit-vector function on a next frame of a stream of incoming video to produce an image bit-vector.

In step 703 "BIT-VECTOR MATCH TO BIT-VECTOR BLOCK?" the digital processor may compare the bit-vector it has generated in step 702 to a bit-vector block associated with a target frame. If the bit-vector is not a match to within a predetermined Hamming distance, the processor may return to step 702 and has the next frame. If it is a match, the processor may instead proceed to step 704 "BIT-VECTOR BLOCK COMPLETE?". In this step the processor may check to ascertain if all the bit-vectors in the bit-vector block have been found. If not, the processor may return to step 702 and bit-vector the next incoming frame. If, however, the bit-vector block has been completely matched, the processor may instead proceed to step 705 "NEXT FRAME IS TARGET FRAME". In this step, the processor may designate the following frame as the target frame of interest.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. A method of synchronizing auxiliary content to a video stream, comprising:
   identifying a target frame in said video stream;
   creating a block of bit-vectors comprising only every nth frame of a multi-frame sequence of image bit-vectors linked to said target frame, where n is an integer greater than or equal to 2;
   transmitting said video stream to an end user device via a first transmission path; transmitting said block of bit-vectors to said end user device via a second transmission path;
   identifying said target frame by said end user device using said block of bit-vectors; synchronizing said auxiliary content to said video stream by said end user device using said target frame; and,
   displaying said synchronized video stream and said auxiliary content on said end user device.

2. The method of claim 1, further comprising:
   obtaining virtual insertion data from said target frame; and,
   transmitting said virtual insertion data with said block of bit-vectors to said end user device via said second transmission path.

3. The method of claim 2, wherein, said virtual insertion data and said block of bit-vectors are compressed using a lossless compression algorithm prior to transmission.

4. The method of claim 2, wherein, said virtual insertion data comprises virtual insertion keying, occlusion, and tracking data; and, said auxiliary content comprises a video image.

5. The method of claim 4, wherein, said auxiliary content is transmitted to said end user device via a third transmission path.

6. The method of claim 1, wherein, said video stream is obtained from cameras at a live event.

7. The method of claim 1, further comprising transmitting to said end user device via said second transmission path a size of said block of bit-vectors.

8. A method of synchronizing auxiliary content to a video stream, comprising:
   identifying a target frame in said video stream;
   creating a block of bit-vectors comprising a multi-frame sequence of image bit-vectors linked to said target frame, said bit-vectors being created using an average bit-vector function comprising the steps of: reducing a video frame to 64 smaller, equally sized images; converting each of said 64 smaller images to a gray scale image; obtaining an average pixel value of each of said 64 smaller gray scale images; obtaining an average value of all 64 average pixel values; and generating an image bit-vector by sequentially appending a 1 for each occurrence of said average pixel value of each of said 64 smaller gray scale images equaling or exceeding said average value of all 64 average values, and a 0 when it does not;
   transmitting said video stream to an end user device via a first transmission path;
   transmitting said block of bit-vectors to said end user device via a second transmission path;
   identifying said target frame by said end user device using said block of bit-vectors;
   synchronizing said auxiliary content to said video stream by said end user device using said target frame; and,
   displaying said synchronized video stream and said auxiliary content on said end user device.

9. The method of claim 8, further comprising:
   a virtual insertion preparation module that obtains virtual insertion data linked to said target frame; and,
   transmits said virtual insertion data with said bit-vector block to said end user device via said second transmission path.

10. A system for synchronizing auxiliary content to a video stream, comprising:
    a bit-vector block module that identifies a target frame of the video stream, and creates a block of bit-vectors comprising only every nth frame of a multi-frame sequence of image bit-vectors linked to said target frame, where n is an integer greater than or equal to 2;
    a first transmitter that transmits said video stream to an end user device;
    a second transmitter that transmits said block of bit-vectors to said end user device;

an auxiliary content supply that supplies an auxiliary content file to said end user device;
a synchronize and display app functioning on said end user device that identifies said target frame using said block of bit-vectors, synchronizes said auxiliary content file to said video stream, and displays said synchronized video stream and said auxiliary content file.

\* \* \* \* \*